Jan. 7, 1930.  F. A. REINHARD  1,742,823
WINDSHIELD WIPER
Filed April 11, 1928
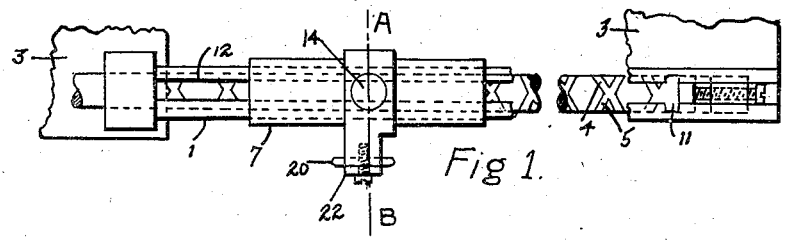
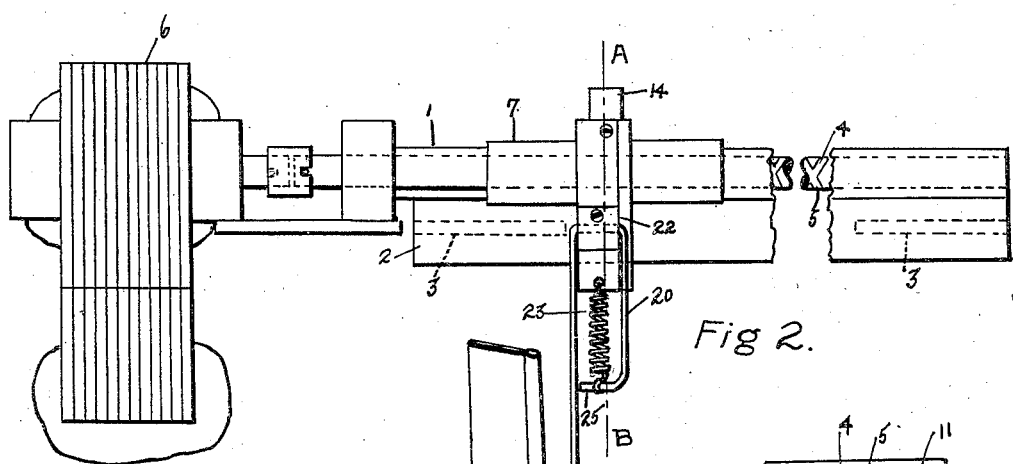
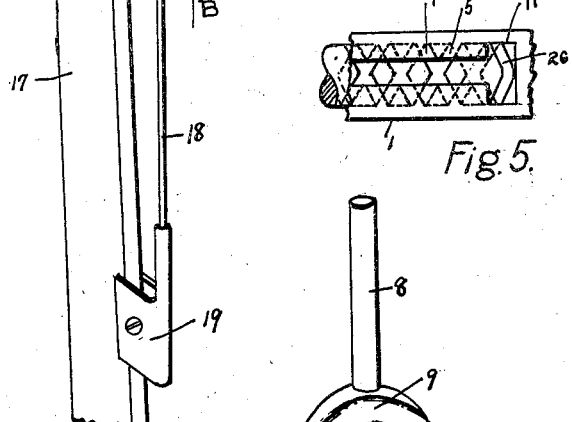
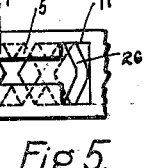
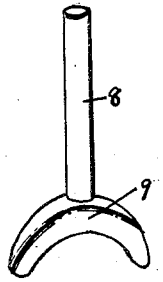
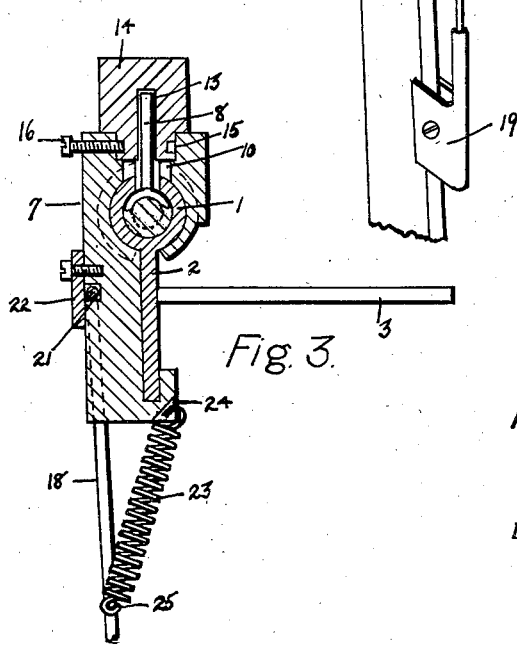
F. A. Reinhard.
INVENTOR.
BY
ATTORNEY.

Patented Jan. 7, 1930

1,742,823

UNITED STATES PATENT OFFICE

FRANK A. REINHARD, OF NORTON, MASSACHUSETTS

WINDSHIELD WIPER

Application filed April 11, 1928. Serial No. 269,115.

This invention relates to windshield wipers of the linearly movable type and the primary object of the invention is to provide a more substantial and compact windshield wiper of this nature.

I am aware that many windshield wipers operated in a straight line across the windshield by screws and other means have been heretofore known and that most of these mechanisms have various objections such as mechanical defects, poor design, expensive to manufacture, etc. It is one of the objects of my invention to provide a screw operated windshield wiper, preferably of the double thread type, wherein the screw is supported along its entire length by direct contact with a tubular supporting member. Furthermore, the wiper carrying carriage is slidably mounted on this supporting member which thereafter serves the double function of (a) supporting the screw along its entire length and (b) providing a track for the carriage. It will of course be clear that this arrangement permits the use of a lighter and more non-rigid screw than could otherwise be used.

Among other objects of my invention may be mentioned the provision of a Y-follower, the bifurcated end of which engages in the screw thread and automatically reverses the movement of the carriage at each end of its travel and the improved novel manner of mounting the wiper support on the carriage. Other and more specific objects will become apparent as this description proceeds.

In the accompanying drawings I have illustrated one specific embodiment of my invention but it will be understood that the invention can be otherwise embodied and that the drawing is not to be construed as defining or limiting the scope of the invention, the claims appended hereto being relied upon for that purpose.

Referring to the figures of the drawing.

Fig. 1 is a fragmentary plan view of a windshield wiper comprising my invention.

Fig. 2 is a front view thereof.

Fig. 3 is a cross sectional view taken on line A—B of Figs. 1 and 2.

Fig. 4 is a perspective view of the Y-follower.

Fig. 5 is a detail view of one end of the screw.

Referring more specifically to the drawing by reference characters, an elongated tubular member 1 is supported on top of a guide 2. Secured to and extending rearwardly from the guide at the ends thereof are a pair of supporting brackets 3 adapted to be secured to the windshield frame. A screw having right and left hand threads 4 and 5 is mounted within the tubular member in a manner directly engaging and being supported by the inner wall of the member, preferably along the entire length of the screw. The screw may be rotated by any desired means, such as a motor 6.

A carriage 7 is slidably mounted on the tubular member 1 and guide 2 in a manner having an accurate sliding fit thereon. A Y-shaped follower 8 is carried by the carriage with the bifurcated end 9 thereof normally engaging in one of the screw threads 4 and 5. In assembling the follower, the end 9 thereof is entered through a slot 10 in the carriage and a transverse slot 11 in one end of the member 1. The member 1 is also provided with a longitudinal slot 12 in which the follower travels in operation. The shank of the follower extends into and is guided by a bore 13 in a member 14. This member 14 is seated in a recess 15 in the carriage and is held therein by a screw 16.

The wiper 17 is adapted to be carried by the carriage as follows: A wire 18 supports the wiper at one end 19. The other end of the wire is bent into a loop 20. The free end of this loop is seated in a notch 21 in the carriage and held therein by a plate 22. A spring 23 has its ends respectively connected to the carriage at 24 and to the other end 25 of the loop in a manner resiliently holding the wiper in contact with the windshield.

It is believed that the operation and novel advantages of my invention will be readily understood and recognized from the above description taken in connection with the drawing. The main elements comprising my improved mechanism are the screw, members 1 and 2 and the carriage 7, and it will be obvious that the construction illustrated provides a most compact and reliable combination. The screw is rigidly supported along its entire length and for this reason the screw can be made relatively small and without rigidity. The members 1 and 2, which may be of one piece as illustrated, if desired, serve the double function of a support for the screw and a track for the carriage.

In operation the screw is rotated in a single direction. The end 9 of the follower rides in one screw thread in a manner moving the carriage along in the direction of that thread. Each thread at the end of the screw leads around into the other thread, as illustrated at 26. When the follower reaches the end of a thread it is thus automatically carried into the other thread, the follower being rotatable on its longitudinal axis in a manner permitting this action. Continued rotation of the screw therefore causes the carriage to automatically traverse the wiper back and forth across the windshield.

It should be particularly noted that the bifurcated Y-end 9 of the follower 8 is of a configuration to fit well into the thread and accurately engage the central solid portion of the screw for a considerable distance therearound. Also it will be noted (Fig. 3) that the outer surface of the follower end 9 is of a configuration to accurately engage the inner tubular wall of the member 1. The follower is therefore held accurately in place by the screw and member 1 independently of the carriage 7. The rigid supporting of the screw by the tubular member 1 permits of the threads 4 and 5 being cut relatively deep and the follower cooperates therewith by fully engaging both radially and circumferentially in these deeply cut threads, as will be understood. It should also be noted that the mounting of the loop 20 on the carriage is such that the sides of the loop engage the sides of the carriage in a manner forming a rigid bracing support for resisting the lateral thrust of the holder 18 as the carriage moves back and forth.

I claim:

1. A windshield wiper comprising the combination of an elongated tubular member, means for supporting the member adjacent and extending along a windshield, a screw within and supported by the member by direct contact of the periphery of the screw with the inner surface of the member, a carriage slidably mounted on and supported solely by its engagement with the exterior surface of the member, a follower carried by the carriage and engaging in the screw thread, a wiper support carried by the carriage, and means for rotating the screw.

2. A windshield wiper comprising the combination of an elongated tubular member, an elongated guide secured to and extending laterally of and parallel to the member, means for supporting the member adjacent and extending along a windshield, a screw within and supported by the member by direct contact of the periphery of the screw with the inner surface of the member, a carriage slidably mounted on and supported by its engagement with the exterior surface of the member and guide, a follower carried by the carriage and engaging in the screw thread, a wiper support carried by the carriage, and means for rotating the screw.

3. In a windshield wiper, the combination of a carriage, a wiper holder comprising a wire having a wiper support at one end and having its other end bent into a loop, the carriage having a notch therein receiving the free end of the loop and a spring having its ends respectively connected to the carriage and to the other end of the loop in a manner resiliently holding the wiper in contact with the windshield.

4. A windshield wiper comprising the combination of an elongated tubular member, means for supporting the member adjacent and extending along a windshield, a screw within and supported by the member by direct contact of the periphery of the screw with the inner wall of the member, a relatively long carriage slidably mounted on and extending more than 180 degrees about the exterior surface of the member whereby the carriage has a very substantial sliding bearing support on the member, the member having a slot therethrough longitudinally thereof, a follower carried by the carriage and extending through the slot and engaging in the screw thread, a wiper support carried by the carriage, and means for rotating the screw.

5. A windshield wiper comprising the combination of an elongated tubular member, means for supporting the member adjacent and extending along a windshield, a double threaded screw within and supported by the member by direct contact of the periphery of the screw with the inner wall of the member along the entire length of their engagement, the member having a slot therethrough longitudinally thereof, a carriage slidably mounted on the member, a Y follower carried by the carriage and engaging in one of the screw threads and extending outwardly through the slot and into engagement with the carriage, the inner end of the follower being of a configuration to fit the bottom of the screw thread and the outer surface of such end being of a configuration to fit the inner wall of the tubular member whereby the follower is held therebetween, a wiper support carried by the carriage, and means for rotating the screw in a single direction, the follower being loosely mounted in the carriage in such manner that it automatically reverses into the other screw thread at each end of its travel along the screw.

In testimony whereof I affix my signature.

FRANK A. REINHARD.